United States Patent
Patel et al.

(10) Patent No.: US 8,412,173 B2
(45) Date of Patent: Apr. 2, 2013

(54) METHOD AND SYSTEM FOR PROVIDING A CONTACT ATTEMPT SERVICE

(75) Inventors: Labhesh Patel, San Francisco, CA (US); Johnny H. Lee, San Gabriel, CA (US); Fadi R. Jabbour, Sunnyvale, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 11/173,052

(22) Filed: Jul. 1, 2005

(65) Prior Publication Data

US 2007/0015497 A1 Jan. 18, 2007

(51) Int. Cl.
*H04M 3/00* (2006.01)

(52) U.S. Cl. .................. 455/418; 455/426.1

(58) Field of Classification Search .......... 455/418, 455/426.1
See application file for complete search history.

(56) References Cited

U.S. PATENT DOCUMENTS

| | | | |
|---|---|---|---|
| 5,155,761 A | 10/1992 | Hammong | |
| 5,185,782 A | 2/1993 | Srinivasan | |
| 5,528,676 A | 6/1996 | Sussell et al. | 379/111 |
| 5,742,674 A | 4/1998 | Jain et al. | |
| 5,878,230 A | 3/1999 | Weber | 709/238 |
| 5,923,848 A | 7/1999 | Goodhand et al. | 395/200 |
| 5,933,477 A | 8/1999 | Wu | 379/88.26 |
| 6,072,867 A | 6/2000 | Lieuwen | 379/220.01 |
| 6,137,864 A | 10/2000 | Yaker | 379/88.22 |
| 6,212,553 B1 | 4/2001 | Lee et al. | 709/206 |
| 6,321,093 B1 | 11/2001 | Dalal | 455/512 |
| 6,327,046 B1 | 12/2001 | Miyamoto et al. | 358/1.15 |
| 6,405,035 B1 * | 6/2002 | Singh | 455/414.1 |
| 6,427,009 B1 | 7/2002 | Reese | 379/215.01 |
| 6,438,217 B1 | 8/2002 | Huna | 379/88.14 |
| 6,453,023 B1 * | 9/2002 | McKee | 379/88.25 |
| 6,507,643 B1 | 1/2003 | Groner | |
| 6,535,506 B1 | 3/2003 | Narain et al. | |
| 6,542,591 B1 | 4/2003 | Amro et al. | 379/142.01 |
| 6,549,950 B2 | 4/2003 | Lytle et al. | 709/246 |
| 6,711,248 B1 | 3/2004 | Haber et al. | |
| 6,721,784 B1 | 4/2004 | Leonard et al. | 709/206 |
| 6,738,461 B2 | 5/2004 | Trandal et al. | 379/142.02 |
| 6,779,020 B1 | 8/2004 | Henrick | |
| 6,799,017 B1 | 9/2004 | Kregel | 455/70 |

(Continued)

FOREIGN PATENT DOCUMENTS

JP   11177616 A   *  7/1999

OTHER PUBLICATIONS

Pending U.S. Appl. No. 11/137,049 entitled, "*System and Method for Associating Due Dates with Messages*", 27 pages specification, claims and abstract, 3 pages of drawings, inventors Labhesh (nmi) Patel, et al., filed May 25, 2005.

(Continued)

*Primary Examiner* — Kamran Afshar
*Assistant Examiner* — Sayed T Zewari
(74) *Attorney, Agent, or Firm* — Baker Botts L.L.P.

(57) ABSTRACT

A method for providing a contact attempt service includes detecting an attempt of a first user to contact a second user through a first communication method and detecting contact between the first user and the second user through a second communication method. The method also includes removing a contact attempt indicator associated with the attempt of the first user to contact the second user through the first communication method.

20 Claims, 2 Drawing Sheets

U.S. PATENT DOCUMENTS

| | | | |
|---|---|---|---|
| 7,133,504 B2 | 11/2006 | Fostick | 379/88.14 |
| 7,139,800 B2 | 11/2006 | Bellotti | |
| 7,145,998 B1 | 12/2006 | Holder et al. | |
| 7,177,404 B2 | 2/2007 | Rosenthal | 379/88.17 |
| 7,212,614 B1 | 5/2007 | Burg | 379/88.18 |
| 7,403,770 B2 | 7/2008 | Hayashi | 455/417 |
| 2002/0147986 A1 | 10/2002 | Michael et al. | 725/110 |
| 2002/0160757 A1 | 10/2002 | Shavit et al. | 455/414.1 |
| 2002/0169841 A1 | 11/2002 | Carlson et al. | |
| 2002/0186828 A1 | 12/2002 | Bushnell | 379/211.02 |
| 2003/0018724 A1 | 1/2003 | Mathewson, II et al. | |
| 2003/0060198 A1 | 3/2003 | Li | 455/434 |
| 2003/0065628 A1 | 4/2003 | Gargiulo | 705/401 |
| 2003/0105827 A1 | 6/2003 | Tan et al. | 709/206 |
| 2004/0249890 A1 | 12/2004 | Fellenstein et al. | |
| 2005/0047562 A1 | 3/2005 | Holz et al. | |
| 2006/0153347 A1 | 7/2006 | Clark | 379/88.18 |
| 2006/0159067 A1* | 7/2006 | Chen et al. | 370/352 |
| 2006/0210029 A1* | 9/2006 | Okon | 379/88.18 |
| 2006/0285661 A1 | 12/2006 | Patel et al. | |
| 2007/0201659 A1 | 8/2007 | Altberg et al. | |
| 2008/0095355 A1 | 4/2008 | Mahalaha et al. | |
| 2008/0247529 A1 | 10/2008 | Barton et al. | |

OTHER PUBLICATIONS

USPTO; Office Action for U.S. Appl. No. 11/137,049 (19 pages), Jan. 15, 2009.
USPTO; Office Action for U.S. Appl. No. 11/137,049, (42 pages), Nov. 23, 2009.
Patel et al. U.S. Patent and Trademark Office communication mailed May 27, 2009 for U.S. Appl. No. 11/137,049.
Patel et al. U.S. Patent and Trademark Office communication mailed Apr. 27, 2010 for U.S. Appl. No. 11/137,049.
Patel et al., U.S. Appl. No. 11/137,049, U.S. Patent and Trademark Office communication, Final Office Action mailed Aug. 23, 2009.
Patel et al., U.S. Appl. No. 11/137,049, U.S. Patent and Trademark Office communication, Office Action mailed Apr. 6, 2011.

* cited by examiner

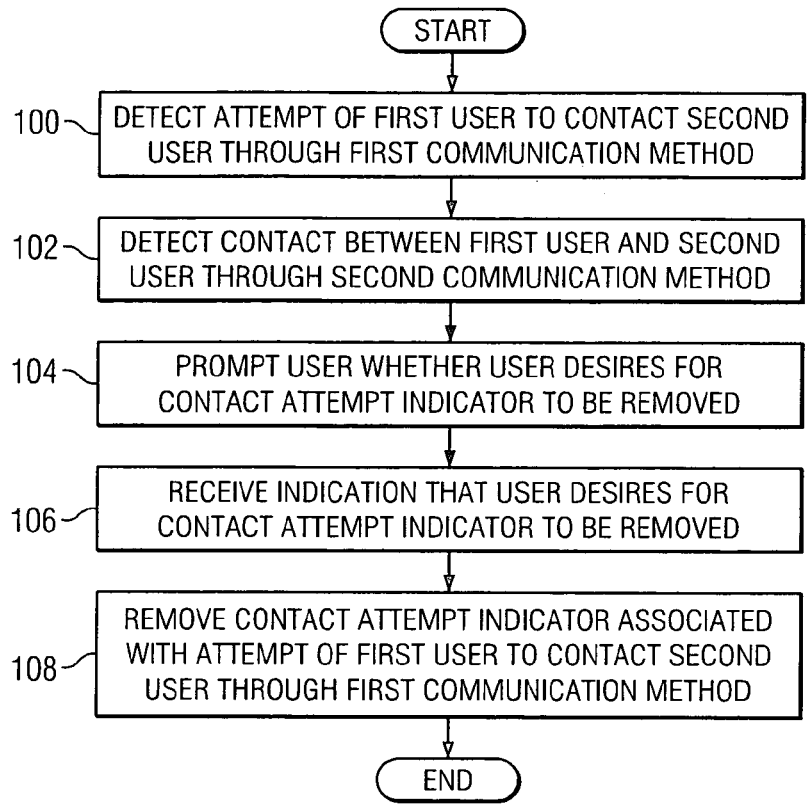
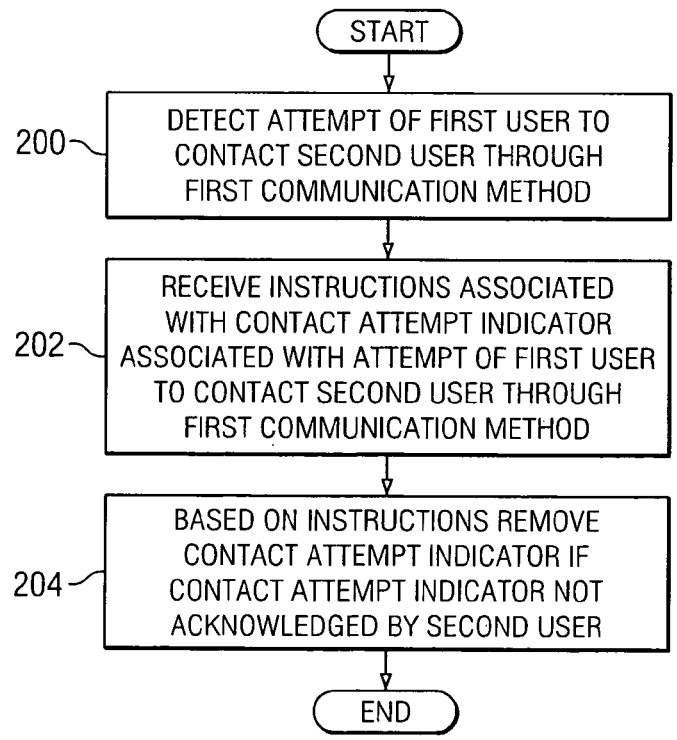

METHOD AND SYSTEM FOR PROVIDING A CONTACT ATTEMPT SERVICE

TECHNICAL FIELD OF THE INVENTION

This invention relates in general to communication systems and, more particularly, to a method and system for providing a contact attempt service.

BACKGROUND OF THE INVENTION

When a person urgently needs to contact someone, the person may try to make contact by going through a list of contact methods, such as work phone, cell phone, instant message, pager, etc. The various mediums of contact may leave a trace to indicate a missed communication attempt. For example, some telephony systems have an indication for missed calls with the call time and phone number. Some systems also save a voicemail. Some instant messaging services allow for offline messaging. If the recipient of a contact attempt is eventually reached through various channels of contact, when he later sees the missed attempts on the other medium he may not know whether the missed attempt was directly correlated to the discussed issue.

SUMMARY OF THE INVENTION

The present invention provides a method and system for providing a contact attempt service that substantially eliminates or reduces at least some of the disadvantages and problems associated with previous methods and systems.

In accordance with a particular embodiment, a method for providing a contact attempt service includes detecting an attempt of a first user to contact a second user through a first communication method and detecting contact between the first user and the second user through a second communication method. The method also includes removing a contact attempt indicator associated with the attempt of the first user to contact the second user through the first communication method.

The first communication method and the second communication method may be the same. The contact attempt indicator may comprise a voicemail message. Removing a contact attempt indicator associated with the attempt of the first user to contact the second user through the first communication method may comprise removing the contact attempt indicator based on a time interval between the attempt of the first user to contact the second user through the first communication method and the detected contact between the first user and the second user through the second communication method. Removing the contact attempt indicator may comprise removing the contact attempt indicator based on predefined instructions. The first communication method may comprise a phone call, and the second communication method may comprise instant messaging or e-mail.

In accordance with another embodiment, a method for providing a contact attempt service includes detecting an attempt of a first user to contact a second user through a first communication method and receiving instructions associated with a contact attempt indicator associated with the attempt of the first user to contact the second user through the first communication method. The method includes, based to the instructions, removing the contact attempt indicator if the contact attempt indicator is not acknowledged by the second user.

Technical advantages of particular embodiments include the ability to recognize contact between two users on a particular communication medium and automatically remove a message or other contact attempt indicator (e.g., a missed call indicator) that resulted from a previous missed contact attempt by one of the users. Accordingly, user efficiency is increased and unnecessary use of communication system resources is reduced.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates a method for providing a contact attempt service, in accordance with an embodiment of the present invention; and FIG. 4 illustrates another method for providing a contact attempt service, in accordance with an embodiment of the present invention.

DETAILED DESCRIPTION OF THE INVENTION

Figure 1:
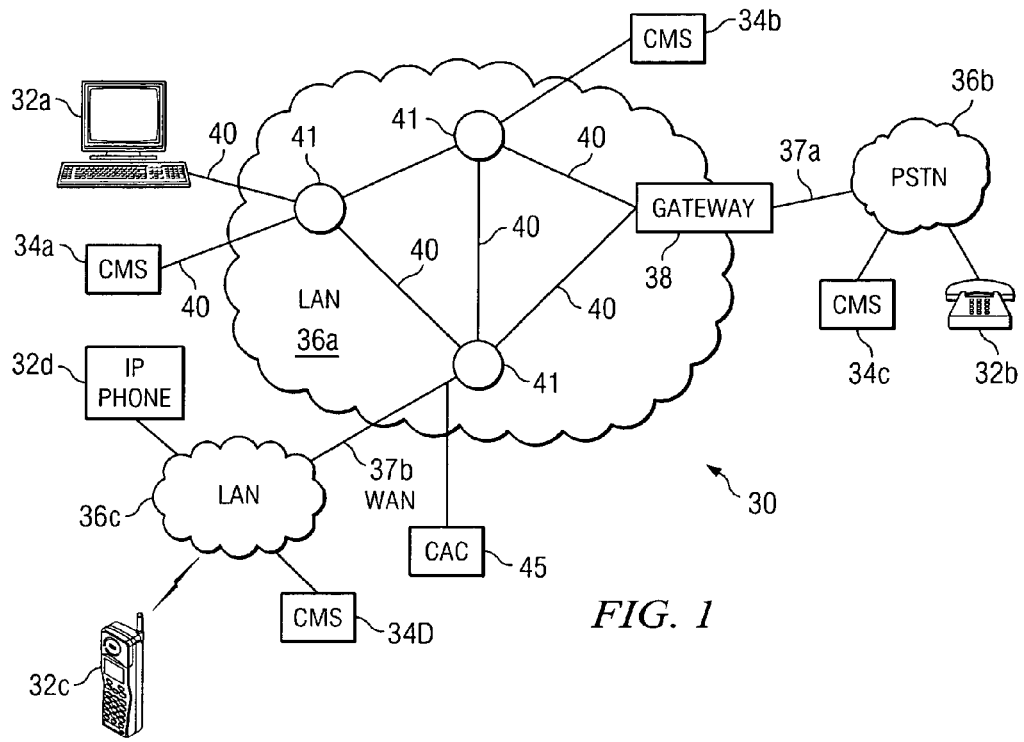
FIG. 1 illustrates a communication system including a plurality of endpoints operable to communicate among each other and a plurality of contact management systems, in accordance with a particular embodiment of the present invention.

FIG. 1 illustrates a communication system 30 including a plurality of endpoints 32a-32d having the ability to establish communication sessions between each other using one or more of communication networks 36a-36c. Communication system 30 also includes contact management systems (CMSs) 34a-34d that manage various aspects of contacts between endpoints 32, including missed contact attempts between the endpoints. "Contacts" shall include requests for communication transmitted using any audio and/or video means, including signals, data or messages transmitted through voice devices, text chat, web sessions, facsimile, instant messaging, short message service and e-mail.

In particular embodiments, a user A may try to contact a user B and may leave a message or otherwise may leave (e.g., via his endpoint), an indication that a contact attempt was made. However, if user B is eventually reached through various channels of contact, when he later sees the missed attempts on the other medium, he cannot always be certain if the missed attempt was directly correlated to the discussed issue and might contact user A again. This wastes the time of both human parties. From a resource point of view, if there is a voicemail or other message awaiting the person, it takes up additional resources on the infrastructure and wastes the recipient's time when he retrieves it. CMSs described herein may recognize that the users ended up getting in touch with each other and may remove the original message or other contact attempt indicator. This increases user efficiency, since user B does not have to waste time listening to an unnecessary voicemail or reading an irrelevant missed contact indicator. In addition, use of communication system resources is reduced.

Moreover, IM clients usually take a finite amount of preconfigured time before they show the user as "Idle." If an IM user A just left her PC and went for a break, her buddy, user B, might think that user A is online and send her a chat message with some information that user B wants only user A to see. If user A is not available on her PC (user B might eventually deduce that by the fact that user A did not reply or her id starts showing "Idle"), user B might want to delete the message so that others don't see it inadvertently. Particular embodiments provide this functionality and enable user B to delete the IM or to provide instructions for deletion of the IM if not read after a particular amount of time.

In the illustrated embodiment, communication network 36a is a local area network (LAN) that enables communication between a plurality of endpoints 32a-32d and CMSs 34a-34d distributed across multiple cities and geographic regions. Communication network 36b is a public switched telephone network (PSTN) and couples endpoint 32b and CMS 34c with communication network 36a through gateway 38. Communication network 36c is another LAN, which couples endpoints 32c and 32d and CMS 34d with communication network 36a. Accordingly, users of endpoints 32a-32d and CMSs 34a-34d can establish communication sessions between and among each network component coupled for communication with one or more of networks 36a-36c. Communication links 37a and 37b couple communication networks 36a and 36b, and communications networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with CMSs 34a and 34b, gateway 38 and communication networks 36b-36c. Therefore, a user of endpoint 32a is provided with access to endpoints 32b-32d, and contact management systems 34a-34d. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or CMSs 34a-34d.

In a particular embodiment, communication network 36a employs voice communication protocols that allow for the addressing or identification of endpoints, nodes, and/or CMSs coupled to communication network 36a. For example, using Internet protocol (IP), each of the components coupled together by communication network 36a in communication system 30 may be identified using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VOIP), or simply Voice over Packet (VoP). In the illustrated embodiment, endpoint 32d, CMSs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, CMSs 34a-34d and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, CMSs, segments, nodes, and gateways, communication system 30 contemplates any number or arrangement of such components for communicating media.

Figure 2:
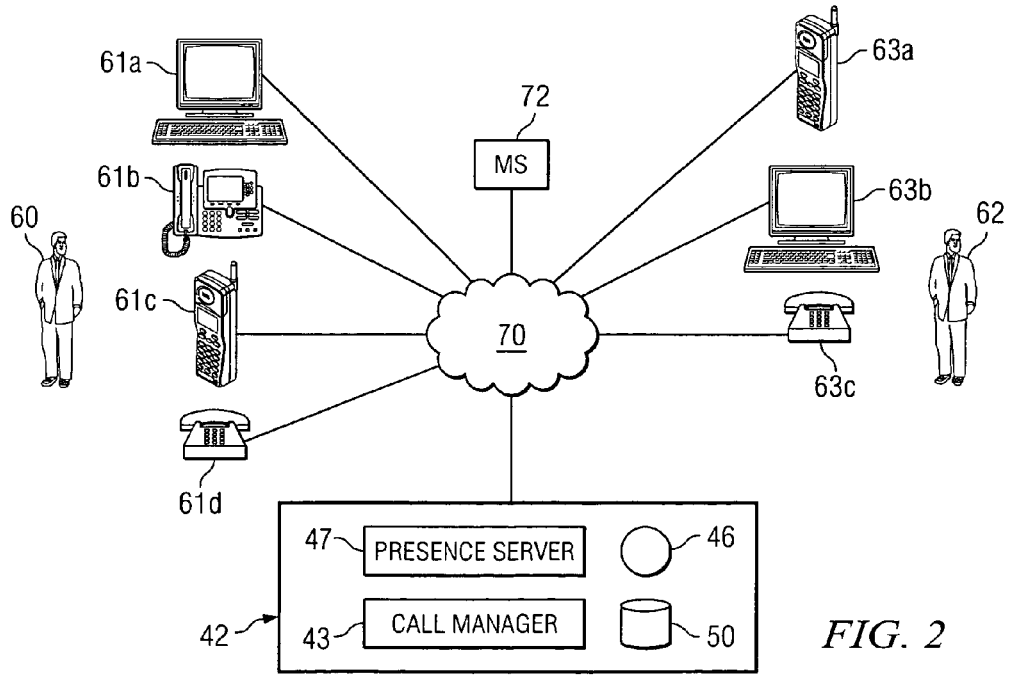
FIG. 2 illustrates a system for providing a contact attempt service, in accordance with a particular embodiment.

FIG. 2 illustrates a CMS 42, a messaging server 72 and user endpoints 61 and 63 coupled to a communication network 70, in accordance with a particular embodiment. Communication network 70 may include and/or be similar to one or more communication networks described above with respect to communication system 30 of FIG. 1. CMS 42 may provide similar functionality to CMSs 34 described above. In the illustrated embodiment, CMS 42 includes a call manager 43, a processor 46, a presence server 47 and a memory module 50. In the illustrated embodiment, a user 60 is associated with PC endpoint 61a, IP phone 61b, cell phone 61c and home phone 61d. User 62 is associated with cell phone 63a, PC 63b and work phone 63c. As indicated above, users may be associated with and may utilize any particular type of endpoint, and such endpoints may be located at any suitable location.

Messaging server 72 supports messaging and other contact services for communication network 70. More specifically, messaging server 72 may generate messages, receive messages generated by other servers, store received or generated messages and/or provide users access to stored messages. Messages may represent voicemail messages, short message service (SMS) messages, email messages, instant messages or messages of any other form, including but not limited to audio, text, and/or video messages and missed contact attempt indicators or messages.

Processor 46 provides, either alone or in combination with other components of CMS 42, functionality of CMS 42 including that described herein with respect to providing contact attempt services. Processor 46 may be a microprocessor, controller, or any other suitable computing device, resource, or combination of hardware, software, and/or encoded logic that allows processor 46 to accomplish functionality of CMS 42 described herein. Memory module 50 may be any form of volatile or non-volatile memory including, without limitation, magnetic media, optical media, random access memory (RAM), read-only memory (ROM), removable media, or any other suitable local or remote memory component.

Call manager 43 may be any combination of hardware, software, and/or encoded logic and is used by CMS 42 to manage users of a communication system. In particular embodiments, call manager 43 may maintain a listing, table, or other organization of information about users. The information may include a name or other identifier for each user. The information may also include contact information such as phone numbers, email addresses and IM addresses for the users and an identification of endpoints and/or communication media associated with each user.

Presence server 47 may be any combination of hardware, software, and/or encoded logic, and is used to detect and monitor the presence of users at various endpoints and using various communication media throughout the communication system. Presence server 47 can tie a particular user to a plurality of communication mediums, such as IM, e-mail, phone (e.g., cell phone, IP phone), SMS, pages, and detect the user's presence on endpoints utilizing such media. For example, presence server 47 may detect that a user is currently using his cell phone, home phone, work phone, PDA, home or work PC or other endpoint.

As indicated above, in particular embodiments CMSs are used to unify missed contact attempts based on contacts through various communication media. For example, when caller 60 uses his cell phone endpoint 61c to call user 62 at his work number (work phone 63c) and gets the voicemail of user 62, caller 60 may leave a message, such as a voicemail message, on messaging server 72 coupled to communication network 70 requesting user 62 to call back. In addition, a missed call indicator may be left at an actual endpoint, such as at work phone endpoint 63c of user 62 indicating that the user missed a call from a specific endpoint or from user 60. But immediately thereafter caller 60 may decide to call cell phone endpoint 63a of user 62, and user 62 may answer the call to cell phone endpoint 63a. Caller 60 and user 62 may discuss the urgent issue at hand. CMS 42, through presence server 47, may, based on the short time interval between the calls and seeing that caller 60 is the same person that initiated both calls to user 62, ask caller 60 (for example, through IM or another communication method) if caller 60 wants to delete the voicemail and the missed call remnant that caller 60 just left for user 62 when calling work phone 63c of user 62. If caller 60 responds that the voicemail and missed call indicator should be deleted, CMS 42 notifies the messaging server to remove the voicemail and sends, for example through call manager 43, a missed call clearance command to the device of user 62 that indicates the missed call.

In particular embodiments, both a caller and a call recipient may be observed by presence server 47 thereby facilitating the recognition and unification of communication attempts across different medium, such as an IM attempt followed by a missed phone call. This can be expanded to identify successful communication even on mediums not monitored by the system. For example, a user may return a page using a pay-phone. The original caller's phone may be monitored, and the user may be identified in his call from the pay-phone through any of a variety of techniques such as voice recognition, user ID prompt or another method.

Some embodiments may implement various rules for removing missed communication indicators according to particular user or operational desires. Rules for removing missed communication indicators may be based on time intervals or various communication mediums and can be customized by an administrator or on a per user basis. For example, user 62 may define that voicemails left for him be deleted, but that missed call notifications be preserved on his phone even if the system would otherwise remove them as a result of contact with the caller. Such rules may be stored in memory module 50.

Some embodiments may also utilize expiration associated with voicemails, missed call attempts and other communication indicators. For example, some communication attempts may be time sensitive and, in some cases, they may lose their relevance once a certain time period has passed. A caller or a call recipient may define expiration intervals for communication attempt indicators using customizable rules. The rules may be based on the identity of the caller, the call recipient or the type of message. For example caller 60 may call user 62 and leave him a voicemail. Before hanging up, caller 60 may indicate that the message is only good for one hour. CMS 42 may delete the message if user 62 does not listen to it within the hour by sending a delete request to messaging server 72.

As indicated above, particular embodiments may be applicable to IM communication attempts. For example, in some systems there is a lag time between the time a user using IM leaves his endpoint device, such as his PC, and a presence system changing the user's status to "Idle" because of a lack of mouse or other activity on the PC. In such a situation, if user 60 has just left his PC endpoint 61a and his status is still "Active," user 62 can send an IM to user 60. The content of the IM might be something that user 62 wants only user 60 to see. If there is no acknowledgement from user 60 for a certain time interval, user 62 might want to delete the last message. Such deletion may be accomplished by CMS 42. In some cases, user 62 can use a control sequence on his local IM client (e.g., running on PC endpoint 63b) which can direct the remote IM client of user 60 (e.g., running on PC endpoint 61b) to delete the previous message sent by user 62.

It will be recognized by those of ordinary skill in the art that CMS 42 is merely one example configuration of a CMS for using presence detection to unify missed contact attempts using various media. CMS 42 may include any number of call managers, processors, memory modules, presence servers or other components to accomplish the functionality and features described herein. For example, although CMS 42 is illustrated and described as including a call manager 43, a processor 46, a presence server 47 and a memory module 50, these components and other desired components for performing the above described functionality may be centrally located (local) with respect to one another, or distributed throughout a communication system. In addition, a communication system may include other components to accomplish functionality of CMS 42 described herein. Such components may include one or more messaging servers or other servers, processors or other hardware or software to accomplish such functionality.

FIG. 3 is a flowchart illustrating a method for providing a contact attempt service, in accordance with a particular embodiment. The method begins at step 100 where an attempt of a first user to contact a second user through a first communication method is detected. For example, the first user may attempt to contact the second user through a phone call, an e-mail, an instant message, an SMS message or through another communication method. The contact attempt may result in a contact attempt indicator left for the second user. The contact attempt indicator may include, for example, a voicemail message, a missed call indicator or an unopened or unread e-mail or instant message, depending on the first communication method. At step 102, actual contact using a second communication method between the first user and the second user is detected. This contact may be detected using any suitable means, such as through a presence server or through voice recognition technology. The second communication method may be same as the first communication method in particular embodiments. The actual contact may comprise, for example, an actual connection over the phone, an e-mail or IM exchange or other contact.

At step 104, one of the users (e.g., first or second) may be prompted whether he desires for a contact attempt indicator associated with the contact attempt of step 100 to be removed. At step 106, an indication is received that the user desires for the contact attempt indicator to be removed.

At step 106, the contact attempt indicator associated with the attempt of the first user to contact the second user through the first communication method is removed. Removing the contact attempt indicator may merely include transmitting a removal instruction to a client or other application or network component (e.g., such as a messaging server) to remove the indicator. In some cases, steps 104 and 106 may not be utilized, and the contact attempt indicator may be automatically removed at step 106, for example as a result of preconfigured rules or instructions of a user or system administrator. For example, in some cases the contact attempt indicator may be removed when the time interval between the contact attempt of step 100 and the actual contact of step 102 is shorted than a particular amount of time.

FIG. 4 is a flowchart illustrating another method for providing a contact attempt service, in accordance with a particular embodiment. The method begins at step 200 where an attempt of a first user to contact a second user through a first communication method is detected. The contact attempt may result in a contact attempt indicator left for the second user. At step 202, instructions associated with the contact attempt indicator associated with the contact attempt are received. The instructions may comprise, for example, an expiration time for the contact attempt indicator (e.g., such as a time after which listening to a voicemail would be pointless or not helpful). The instructions may also comprise, for example, a time limit for an e-mail or instant message. At step 204, the contact attempt indicator is removed based on the instructions if the indicator has not been acknowledged by the second user. For example, if a time limit had been placed on an IM by the first user, if the second user had not read the IM by the time limit, then it may be removed. Removing the contact attempt indicator may merely include transmitting a removal instruction to a client or other application or network component (e.g., such as a messaging server) to remove the indicator.

Some of the steps illustrated in FIGS. 3 and 4 may be combined, modified or deleted where appropriate, and additional steps may also be added to the flowcharts. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and CMS 42, these elements may be combined, rearranged or positioned in order to accommodate particular routing architectures or needs. In addition, any of these elements may be provided as separate external components to communication system 10, CMS 42 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing a contact attempt service, comprising:
    detecting an attempt of a first user to contact a second user through a first communication method;
    detecting contact between the first user and the second user through a second communication method;
    determining that a time interval between the attempt of the first user to contact the second user through the first communication method and the detected contact between the first user and the second user through the second communication method is shorter than a predetermined threshold amount of time; and
    removing a contact attempt indicator associated with the attempt of the first user to contact the second user through the first communication method based on the determination that the time interval between the attempt of the first user to contact the second user through the first communication method and the detected contact between the first user and the second user through the second communication method is shorter than a predetermined threshold amount of time.

2. The method of claim 1, wherein the first communication method and the second communication method are the same.

3. The method of claim 1, wherein the contact attempt indicator comprises a voicemail message.

4. The method of claim 1:
    further comprising:
        prompting the first user whether the first user desires for the contact attempt indicator to be removed; and receiving from the first user an indication that the first user desires for the contact attempt indicator to be removed; and wherein removing the contact attempt indicator comprises removing the contact attempt indicator based on the indication that the first user desires for the contact attempt indicator to be removed.

5. The method of claim 1, wherein removing the contact attempt indicator comprises removing the contact attempt indicator based on predefined instructions.

6. The method of claim 1, wherein the first communication method comprises a phone call.

7. The method of claim 1, wherein the second communication method comprises instant messaging.

8. The method of claim 1, wherein the second communication method comprises an e-mail.

9. The method of claim 1, wherein detecting contact between the first user and the second user comprises detecting, using voice recognition, contact between the first user and the second user.

10. A system for providing a contact attempt service, comprising:
a processor operable to detect an attempt of a first user to contact a second user through a first communication method;
a presence server coupled to the processor and operable to detect contact between the first user and the second user through a second communication method
the processor operable to determine that a time interval between the attempt of the first user to contact the second user through the first communication method and the detected contact between the first user and the second user through the second communication method is shorter than a predetermined threshold amount of time; and
the processor operable to remove a contact attempt indicator associated with the attempt of the first user to contact the second user through the first communication method based on the determination that the time interval between the attempt of the first user to contact the second user through the first communication method and the detected contact between the first user and the second user through the second communication method is shorter than a predetermined threshold amount of time.

11. The system of claim 10, wherein the first communication method and the second communication method are the same.

12. The system of claim 10, wherein the contact attempt indicator comprises a voicemail message.

13. The system of claim 10, wherein:
the processor is further operable to:
prompt the first user whether the first user desires for the contact attempt indicator to be removed; and
receive from the first user an indication that the first user desires for the contact attempt indicator to be removed; and
the processor operable to remove the contact attempt indicator comprises the processor operable to remove the contact attempt indicator based on the indication that the first user desires for the contact attempt indicator to be removed.

14. The system of claim 10, wherein the processor operable to remove the contact attempt indicator comprises the processor operable to remove the contact attempt indicator based on predefined instructions.

15. The system of claim 10, wherein the first communication method comprises a phone call.

16. The system of claim 10, wherein the second communication method comprises instant messaging.

17. The system of claim 10, wherein the second communication method comprises an e-mail.

18. The system of claim 10, wherein a presence server operable to detect contact between the first user and the second user comprises a presence server operable to detect, using voice recognition, contact between the first user and the second user.

19. A system for providing a contact attempt service, comprising:
means for detecting an attempt of a first user to contact a second user through a first communication method;
means for detecting contact between the first user and the second user through a second communication method;
means for determining that a time interval between the attempt of the first user to contact the second user through the first communication method and the detected contact between the first user and the second user through the second communication method is shorter than a predetermined threshold amount of time; and
means for removing a contact attempt indicator associated with the attempt of the first user to contact the second user through the first communication method based on the determination that the time interval between the attempt of the first user to contact the second user through the first communication method and the detected contact between the first user and the second user through the second communication method is shorter than a predetermined threshold amount of time.

20. Logic embodied in a non-transitory computer readable medium, the computer readable medium comprising code operable to:
detect an attempt of a first user to contact a second user through a first communication method;
detect contact between the first user and the second user through a second communication method;
determine that a time interval between the attempt of the first user to contact the second user through the first communication method and the detected contact between the first user and the second user through the second communication method is shorter than a predetermined threshold amount of time; and
remove a contact attempt indicator associated with the attempt of the first user to contact the second user through the first communication method based on the determination that the time interval between the attempt of the first user to contact the second user through the first communication method and the detected contact between the first user and the second user through the second communication method is shorter than a predetermined threshold amount of time.

* * * * *